United States Patent [19]

Schucker

[11] Patent Number: 5,039,418

[45] Date of Patent: Aug. 13, 1991

[54] MEMBRANE MADE FROM A MULTI-BLOCK POLYMER COMPRISING AN OXAZOLIDONE PREPOLYMER CHAIN EXTENDED WITH A COMPATIBLE SECOND PREPOLYMER AND ITS USE IN SEPARATIONS

[75] Inventor: Robert C. Schucker, Baton Rouge, La.

[73] Assignee: Exxon Research and Engineering Company, Florham Park, N.J.

[21] Appl. No.: 624,161

[22] Filed: Dec. 6, 1990

[51] Int. Cl.$^5$ .............................. B01D 61/36
[52] U.S. Cl. ........................ 210/640; 210/650; 210/651; 210/653; 210/500.38; 523/461
[58] Field of Search ............... 210/640, 651, 653, 654, 210/500.27, 500.38, 644, 634, 500.39; 521/128, 139; 523/461; 525/113; 528/188

[56] References Cited

U.S. PATENT DOCUMENTS

| | | | |
|---|---|---|---|
| 2,930,754 | 3/1960 | Stuckey | 210/23 |
| 2,958,656 | 11/1960 | Stuckey | 210/23 |
| 3,370,102 | 2/1968 | Carpenter et al. | 260/674 |
| 3,847,874 | 11/1974 | Murakami et al. | 260/77.5 |
| 4,115,465 | 9/1978 | Elfert et al. | 260/674 |
| 4,151,222 | 4/1979 | Hergenrother et al. | 521/139 |
| 4,366,062 | 12/1982 | Kurihara et al. | 210/651 |
| 4,386,191 | 5/1983 | DiSalvo et al. | 525/504 |
| 4,557,949 | 12/1985 | Kurihara et al. | 427/244 |
| 4,914,064 | 4/1990 | Schucker | 502/4 |
| 4,918,119 | 4/1990 | Seltmann et al. | 523/461 |
| 4,929,357 | 5/1990 | Schucker | 210/640 |
| 4,929,358 | 5/1990 | Koenitzer | 210/640 |
| 4,946,594 | 8/1990 | Thaler et al. | 310/651 |

FOREIGN PATENT DOCUMENTS

| | | |
|---|---|---|
| 0044872 | 2/1982 | European Pat. Off. . |
| 255381 | 2/1988 | European Pat. Off. . |
| 361377 | 4/1990 | European Pat. Off. . |
| 121150 | 4/1980 | Japan . |
| 160960 | 4/1983 | Japan . |

Primary Examiner—Robert A. Dawson
Assistant Examiner—Ana M. Fortuna
Attorney, Agent, or Firm—Joseph J. Allocca

[57] ABSTRACT

A multi-block polymer comprising an oxazolidone prepolymer chain extended with a second compatible prepolymer, the membrane made therefrom and the use of said membrane in aromatics/non-aromatics separations is disclosed. The multi-block polymer comprises an oxazolidone containing prepolymer chain extended with a second compatible prepolymer, said second prepolymer selected from the group of prepolymers produced by combining (a) and (A) diisocyanate with a monomer selected from (B) polyester dianhydride or corresponding tetraacid or diacid-diester, and diamine in an A/B mole ratio ranging from about 2.0 to 1.05, preferably 2.0 to 1.1; (b) an (A) dianhydride or its corresponding tetraacid or diacid-diester with a monomer selected from (B) epoxy, diisocyanate, polyester and diamine in an A/B mole ratio ranging from about 2.0 to 1.05, preferably about 2.0 to 1.1, or (c) an (A) diamine with a monomer selected from (B) epoxy, diisocyanate, dianhydride, or its corresponding tetraacid or diacid-diester in an A/B mole ratio ranging from about 2.0 to 1.05, preferably about 2.0 to 1.1, and mixtures thereof. The membranes made from these multi-block polymers comprising thin dense films of said polymer deposited on a micro-porous support are also claimed. The membranes are useful for separating aromatic hydrocarbons from mixtures of same with non-aromatic hydrocarbons under perstraction or pervaporation conditions.

12 Claims, No Drawings

MEMBRANE MADE FROM A MULTI-BLOCK POLYMER COMPRISING AN OXAZOLIDONE PREPOLYMER CHAIN EXTENDED WITH A COMPATIBLE SECOND PREPOLYMER AND ITS USE IN SEPARATIONS

The present invention is directed to a multi-block polymeric material comprising an oxazolidone prepolymer chain extended in an about 1 to 1 mole ratio with a second compatible prepolymer selected from the group of prepolymers comprising (a) an (A) diisocyanate combined with a monomer selected from (B) polyester, diamine, and dianhydride or it corresponding tetraacid or diacid-diester in an A/B mole ratio ranging from about 2.0 to 1.05, preferably about 2.0 to 1.1; (b) an (A) dianhydride or its corresponding tetraacid or diacid-diester combined with a monomer selected from (B) epoxy, diisocyanate, polyester, and diamine in A/B mole ratio ranging from about 2.0 to 1.05, preferably about 2.0 to 1.1; and (c) an (A) diamine combined with a monomer selected from (B) epoxy, diisocyanate, and dianhydride or its corresponding tetraacid or diacid-diester in an A/B mole ratio ranging from about 2.0 to 1.05, preferably about 2.0 to 1.1, and mixtures thereof. Reactions between certain of these pairs may require the use of chemical derivatization known to those skilled in the art.

The present invention is also directed to membranes made of such multi-block polymeric material especially membranes comprising thin, nonporous dense films of said multi-block polymeric material either unsupported or deposited on a microporous support layer producing a thin film composite membrane.

The membranes of the present invention are useful for separating aromatic hydrocarbons including heteroatom containing aromatics from mixtures of same with non-aromatic hydrocarbons under perstraction or pervaporation conditions.

BACKGROUND OF THE INVENTION

Polyurea/urethane membranes and their use for the separation of aromatics from non-aromatics are the subject of U.S. Pat. No. 4,914,064. In that case the polyurea/urethane membrane is made from a polyurea/urethane polymer characterized by possessing a urea index of at least about 20% but less than 100%, an aromatic carbon content of at least about 15 mole percent, a functional group density of at least about 10 per 1000 grams of polymer, and a C=O/NH ratio of less than about 8.0. The polyurea/urethane multi-block copolymer is produced by reacting dihydroxy or polyhydroxy compounds, such as polyethers or polyesters having molecular weights in the range of about 500 to 5,000 with aliphatic, alkylaromatic or aromatic diisocyanates to produce a prepolymer which is then chain extended using diamines, polyamines or amino alcohols. The membranes are used to separate aromatics from non-aromatics under perstraction or pervaporation conditions.

The use of polyurethane imide membranes for aromatics from non-aromatics separations is disclosed in U.S. Pat. No. 4,929,358. The polyurethane-imide membrane is made from a polyurethane-imide copolymer produced by end capping a polyol such as a dihydroxy or polyhydroxy compound (e.g. polyether or polyester) with a di or polyisocyanate to produce a prepolymer which is then chain extended by reaction of said prepolymer with a di or polyanhydride or with a di or polycarboxylic acid to produce a polyurethane/imide. The aromatic/non-aromatic separation using said membrane is preferably conducted under perstraction or pervaporation conditions.

A polyester imide copolymer membrane and its use for the separation of aromatics from non-aromatics is the subject of U.S. Pat. No. 4,946,594. In that case the polyester imide is prepared by reacting polyester diol or polyol with a dianhydride to produce a prepolymer which is then chain extended preferably with a diisocyanate to produce the polyester imide.

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e. aromatic, unsaturated, saturated, by permeating a portion of the mixture through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.).

U.S. Pat. No. 2,930,754 teaches a method for separating hydrocarbons e.g. aromatic and/or olefins from gasoline boiling range mixtures, by the selective permeation of the aromatic through certain cellulose ester non-porous membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

U.S. Pat. No. 4,929,357 is directed to non-porous isocyanurate crosslinked polyurethane membranes. The membrane can be in the form of a symmetric dense film membrane. Alternatively, a thin, dense layer of isocyanurate crosslinked polyurethane can be deposited on a porous backing layer to produce a thin film composite membrane. The isocyanurate crosslinked polyurethane membrane can be used to separate aromatic hydrocarbons from feed streams containing mixtures of aromatic hydrocarbons and non-aromatic hydrocarbons, the separation process being conducted under reverse osmosis, dialysis, perstraction or pervaporation conditions, preferably under perstraction or pervaporation conditions.

U.S. Pat. No. 4,366,062 teaches reverse osmosis using a composite isocyanurate membrane. The method selectively separates at least one water soluble material from an aqueous solution. The membrane comprises a microporous substrate and a barrier layer about 0.01 to 0.1 micron thick. It is composed of a crosslinked polymeric material having isocyanurate structure and substituents appended thereto selected from hydrogen, glycidyl groups and alkyl radical groups containing 2 to 5 carbon atoms which may also contain functional hydroxyl groups or glycidyl groups. The crosslinked polymeric material has ester or ether linkages or combination thereof connecting the isocyanurate structures to each other.

U.S. Pat. No. 4,557,949 teaches a method for making the reverse osmosis semipermeable membrane disclosed in U.S. Pat. No. 4,366,062.

European Application 0044872 teaches selectively separating water soluble materials from a solution under reverse osmosis conditions using a membrane having a porous support layer carrying a barrier layer of crosslinked isocyanurate polymer.

Japanese Application 81/160960 teaches a composite membrane for reverse osmosis made by applying a solution of a barrier layer-forming component to a substrate, then heating it.

Japanese Application 78/121150 teaches an isocyanurate network terpolymer useful for the production of a selective permeation membrane. A polymer having hydroxyl groups and tert amine groups in the side chain is reacted with cyanuric chloride and subject to terpolymerization by reacting the tert amine groups with produced hydrochloride to give a polymerized polyisocyanurate. A polymer made using glycidyl methacrylate-styrene copolymer, diethyl amine in benzene and methanol was produced having 2-hydroxy-3-diethylaminopropyl group. This polymer was crosslinked with cyanuric chloride and cast on a PTFE plate and kept 24 hours at 40° to give a 44μ membrane. This membrane was used to separate a mixture of cyclohexane and benzene under pervaporation conditions. A permeate gas which was 100% benzene was recovered at a rate of 0.0025 g/m²-hr.

DETAILED DESCRIPTION OF THE INVENTION

The present invention comprises a multi-block polymeric material comprising a first prepolymer, made by combining (A) an epoxy with (B) a diisocyanate in an A/B or B/A mole ratio ranging from about 2.0 to 1.05, preferably about 2.0 to 1.1 mole ratio to produce an oxazolidone-containing molecule which is subsequently chain extended with a second, compatible prepolymer selected from the group of prepolymers comprising an (A) diisocyanate combined with a monomer selected from (B) polyester, diamine, and dianhydride or its corresponding tetra-acid or diacid-diester, in an A/B mole ratio ranging from about 2.0 to 1.05, preferably about 2.0 to 1.1, (b) an (A) dianhydride or its corresponding tetraacid or diacid-diester combined with a monomer selected from (B) epoxy, diisocyanate, polyester, and diamine, in an A/B mole ratio ranging from about 2.0 to 1.05, preferably about 2.0 to 1.1, and (c) an (A) diamine combined with a monomer selected from (B) epoxy, diisocyanate, and dianhydride or its corresponding tetra-acid or diacid-diester in an A/B mole ratio ranging from about 2.0 to 1.05, preferably about 2.0 to 1.1, and mixtures thereof. Reactions betweeen certain of these pairs may require the use of chemical derivatization known to those skilled in the art.

The present invention is also directed to membranes of the above recited multi-block polymeric materials, especially membranes comprising thin, nonporous dense films of said multi-block polymeric material deposited on a microporous support layer producing a thin film composite membrane.

The membranes of the multi-block polymeric material, especially the thin film composite membranes are useful for separating aromatic hydrocarbons from mixtures of same with non-aromatic hydrocarbons under perstraction or pervaporation conditions. As used hereinafter in this text and the appended claims the term "aromatic hydrocarbons" is meant to include single and multi-ring side chain bearing and unsubstituted aromatics containing only carbon and hydrogen, single and multi-ring side chain bearing and unsubstituted heterocyclic aromatics such as thiophene, furan pyridine, quinoline, benzothiophene, benzofuran, etc., and single and multi-ring aromatic and heterocyclic aromatics bearing heteroatom substituted side chains.

In preparing the multi-block polymeric material one begins by preparing a first prepolymer made by combining (A) an epoxy with (B) a diisocyanate in an A/B or B/A mole ratio ranging from about 2.0 to 1.05, preferably about 2.0 to 1.1. The prepolymer is identified as being an oxazolidone.

The epoxy used to produce the oxazolidone prepolymer has the general formula:

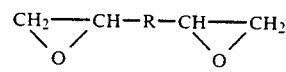

R may be any saturated, unsaturated, or aromatic group, halogen substituted saturated, unsaturated or aromatic group as well as groups containing oxygen in the form of ether linkages, and mixtures thereof.
Representative of useful epoxy compounds are the following:

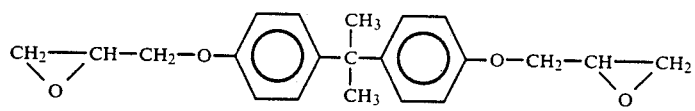

identified as DER332 (diglycidyl ether of Bisphenol A) from Dow Chemical and

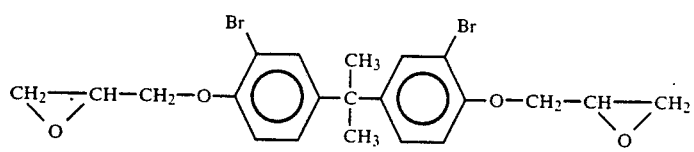

identified as DER542 from Dow Chemical

The epoxy is reacted with a di or poly isocyanate.

Aliphatic and cycloaliphatic di and polyisocyanates can be used as can be mixtures of aliphatic, cycloaliphatic, alkylaromatic and aromatic polyisocyanates.

The diisocyanates are preferably aromatic diisocyanates having the general structure:

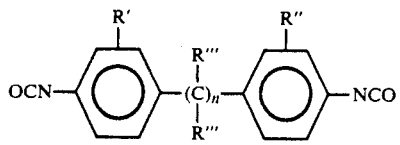

wherein R' R" and R"' are the same or different and are selected from the group consisting of H, $C_1$–$C_5$ and $C_6H_5$ and mixtures thereof and n ranges from 0 to 4.

Aliphatic diisocyanates which may be utilized are exemplified by hexamethylene diisocyanate (HDI), 1,6-diisocyanato-2,2,4,4-tetramethylhexane (TMDI), 1,4-cyclohexanyl diisocyanate (CHDI), isophorone diisocyanate (IPDI), while useful alkylaromatic diisocyanates are exemplified by 2,4-toluene diisocyanate (TDI) and bitolylene diidocyanate (TODI). Aromatic diisocyanates are exemplified by 4,4'-diisocyanato diphenylmethane (MDI), methylene dichlorophenyl diisocyanate (dichloro MDI), methylene dicyclohexyl diisocyanate ($H_{12}$-MDI), methylene bis [dichlorophenyl isocyanate] (tetrachloro MDI), and methylene bis [dichlorocyclohexyl isocyanate] (tetrachloro - $H_{12}$-MDI). Polyisocyanates are exemplified by polymeric MDI (PMDI) and carbodiimide modified MDI and isocyanurate isocyanates.

The epoxy and diisocyante are combined in a solvent such as cellosolve acetate or NMP in the presence of a catalyst such as zinc chloride or lithium chloride and heated to a temperature and for a time sufficient to drive the reaction to completion. Heating is normally to a temperature on the order of 140° C. Additional details can be found in Kardomenos, P. J.; K. C. Frisch and J. E. Kresta, *Journal of Coatings Technology*, 55 (700), 49(1983). Because of the need to employ such elevated temperatures, the selection of appropriate reaction solvents is limited to those which do not decompose or volatilize at the temperature employed and which do not themselves react with the reactants at elevated temperature.

For the oxazolidone prepolymer prepared in an epoxy/diisocyanate mole ratio ranging from about 2.0 to 1.05, reaction completion is evidenced by the disappearance of isocyanate band at 2230 cm$^{-1}$ (in the Infrared spectrum) and by a doubling of the weight per equivalent of epoxy. Techniques well known to those skilled in the art can be employed to monitor the reaction progress.

The second compatible prepolymer which is added to the epoxy oxazolidone is selected from the group of prepolymers consisting of (a) an (A) diisocyanate combined with a monomer selected from (B) polyester, diamine, and dianhydride or its corresponding tetraacid or diacid-diester, in an A/B mole ratio ranging from about 2.0 to 1.05, preferably about 2.0 to 1.1; (b) an (A) dianhydride or its corresponding tetra-acid or diacid-diester combined with a monomer selected from (B) epoxy, diisocyanate, polyester, and diamine in an A/B mole ratio ranging from about 2.0 to 1.05, preferably about 2.0 to 1.1; and (c) an (A) diamine combined with a monomer selected from (B) epoxy, diisocyanate, and dianhydride or its corresponding tetraacid or diacid-diester in an A/B mole ratio ranging from about 2.0 to 1.05, preferably about 2.0 to 1.1, and mixtures thereof. Reactions between certain of these pairs may require the use of derivatization techniques known to those skilled in the art.

The diisocyanate used in preparing this second compatible prepolymer is selected from the same group as previously described for the production of the epoxy oxazolidone.

The epoxy used in preparing this second compatible prepolymer is also selected from the same group as previously described for the production of the epoxy oxazolidone.

Polyesters having molecular weights in the range of about 500 to 5000 can be used in preparing the second compatible prepolymer.

The polyester components are prepared from aliphatic or aromatic dicarboxylic acids and aliphatic or aromatic dialcohols. Aliphatic dicarboxylic acids refer to those materials having the general formula HOOCRCOOH where R contains 2 to 10 carbons (and may be either a straight or branched chain configuration). Aromatic dicarboxylic acids refer to those materials having the general structure HOOCRCOOH where R is:

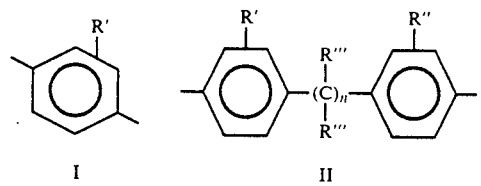

I    II wherein R', R", and R"' may be the same or different and are selected from the group consisting of H and $C_1$–$C_5$ carbons or $C_6H_5$ and combinations thereof, and n is 0 to 4. It is to be understood that in the above formula each R' or R" may itself represent a mixture of H, $C_1$–$C_5$ or $C_6H_5$.

Dialcohols have the general structure HOROH where R may be

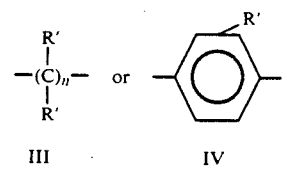

III    IV where n is 1 to 10, preferably 4 to 6, and R' is H, $C_1$ to $C_5$ or $C_6H_5$ or

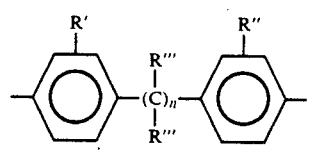

V where R', R", R"' and n are defined in the same manner as for the aromatic dicarboxylic acids. An example of a useful dialcohol is bisphenol A.

Diamines which can be used have the general formula $H_2NRNH_2$ where R includes aliphatic and aromatic moieties, such as

where n is 1 to 10 and R' may be the same or different and are selected from the group consisting of H, $C_1$-$C_5$ carbons and $C_6H_5$ and mixtures thereof.

Also included are diamines of the formula:

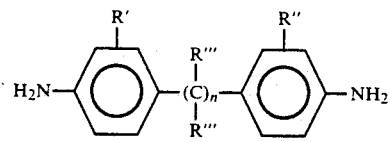

where R', R" and R'" are the same or different and are selected from the group consisting of H or Cl or a $C_1$ to $C_5$ or $C_6H_5$ and mixtures thereof and n ranges from 0 to 4.

Useful polyamines are exemplified by polyethyleneimines and 2,2',2" triaminotriethylamine. Useful amino alcohols are exemplified by 6-aminohexanol, 4-aminophenol, 4-amino-4'-hydroxyl-diphenylmethane.

Dianhydrides or poly carboxylic acids which produce amide acid groups are also used in producing the second prepolymer.

Any aromatic, aliphatic, cycloaliphatic or alkylaromatic dianhydride can be used. Examples of di anhydrides include by way of example and not limitation: pyromellitic dianhydride, 3,3',4,4'-benzophenone tetracarboxylic dianhydride, 4,4'-(hexafluoroisopropylidene)-bis-(phthalic anhydride), 4,4'-oxydiphthalic anhydride, diphenylsulfone-3,3,4,4'-tetracarboxylic dianhydride, and 3,3',4,4'-biphenyltetracarboxylic dianhydride.

Dicarboxylic acid/diester and tetracarboxylic acid derivatives of dianhydrides can also be used but must first be converted to species that will react with diamines or polyesters. This can be done by conversion of the dicarboxylic acid/diester or tetracarboxylic moieties to (1) acid chlorides via derivatization with e.g. thionyl chloride or to (2) diimidazoles via reaction with e.g. carbonyl diimidazole. Subsequent reaction of the derivatized prepolymer with diamines results in formation of an amide acid which must then be thermally or chemically cyclized to form the imide. Subsequent reaction of the derivatized prepolymer with polyesters results in the formation of additional ester linkages which require no further curing.

In each instance the appropriate monomeric materials in the aforementioned mole ratios are combined to produce the desired second prepolymer. Depending on the physical nature of the second prepolymer the reagents are combined and either reacted to completion or to a point short of completion. The reaction is run to completion when such second prepolymer exists in liquid or solution form. If however the second prepolymer when run to completion would be in the form of a solid or insoluble gel, then reaction to completion is unacceptable. In such instances the reagents are reacted until just before the viscosity of the reaction mixture becomes too difficult to manage. The second prepolymer is then, combined with the first prepolymer.

The first and second prepolymers can be reacted neat, that is, in the absence of added solvent, if their individual natures favor such absence of solvent, or the reaction can be run in the presence of a solvent appropriate for the polymerization conditions employed. In general the reaction will be run in a solvent which may be selected from any of the polar, aprotic solvents such as tetrahydrofuran (THF), DMAC, DMSO, DMF, as well as NMP and cellosolve acetate.

The first and second prepolymers are preferably reacted in an appropriate solvent. Certain combinations of first prepolymer and second prepolymer may be reacted to completion while other combinations must be used to cast a membrane before the reaction goes to completion, i.e. while the reactant solution is still of a manageable viscosity and before formation of a gel. In those instances, which can be determined by the practitioner using the information before him in this specification without the expenditure of any inventive effort, the solution is spread or poured on the appropriate support, the resulting copolymer layer on support inserted into an oven to drive off the casting solution solvent, then heated to a temperature for a time sufficient to drive the polymerization reaction to completion and cure the membrane. This is the procedure to be followed when, for example, the oxazolidone prepolymer is reacted with a second prepolymer made from 2 moles dianhydride and one mole polyester.

When an isocyanate end-capped oxazolidone prepolymer is made by reacting a diisocyanate with an epoxy in a diisocyanate/epoxy mole ratio ranging from about 2.0 to 1.05, it can be chain extended using a second isocyanate end capped prepolymer made by reacting an (A) diisocyanate with (B) polyester, diamine or dianhydride or its corresponding tetraacid or diaciddiester in an A/B mole ratio ranging from about 2.0 to 1.05, preferably about 2.0 to 1.1, the two prepolymers themselves being combined in any mole ratio in the presence of a trimerization catalyst to produce an isocyanurate crosslinked polymer.

Trimerization is accomplished using a standard trimerization catalyst such as N,N',N"-tris(dimethylaminopropyl)-s-hexahydrotriazine, Sodium ethoxide, Potassium octoate, N-Hydroxypropyl-trimethylammonium-2-ethylhexanote, Potassium 2-ethylhexanoate, Trialkyl phosphines, 2,4,6-Tris(dimethylaminomethyl)phenol and mixtures thereof. Using these catalyst yields a mixture which slowly thickens due to cross-linking accounted for by the formation of isocyanurate rings. Before this mixture becomes too thick, it is deposited as a thin film on an appropriate substrate and permitted to fully gel, after which the membrane coating is treated to complete the formation of isocyanurate crosslinked polymer. This final treat can constitute no more than waiting a sufficiently long time to be certain that trimerization is complete. More likely this final treat will involve various degrees of drying followed, preferably, by heating to complete the trimerization to the isocyanurate cross-linked polymer.

The copolymer in solvent is used as a casting solution. Polymer concentration in solvent ranges from 10 to 70 wt. % preferably 15-50 wt. % for casting dense films. When casting integral thin film composite membranes, e.g. thin layers of polymer on support backings such as ceramics or sintered glass or metal or polymeric supports such as nylon, porous polypropylene, porous Teflon ®, or porous polyurea, preferably porous Teflon ®, the polymer concentration in solution is on the order of about 50% or less.

The casting solution is poured or spread on an appropriate support medium, such as a metal or glass plate or, if desired, a woven fiber backing, such as woven fiberglass, nylon, polyester, etc. can be used if solvent removal during the casting sequence employs a vacuum, but preferably, non-woven backings such as thin films of porous polypropylene, porous polyurea or porous Teflon ® are employed. In general, however, backing materials used are those which are not attacked by the solvent(s) used to produce the copolymer casting solution and which can survive in the environment (chemical and thermal) to which the membrane will be exposed.

The membrane may be cast in any thickness, membranes ranging in thickness of from about 0.1 to about 50 microns being preferred.

Alternatively a very thin layer of the multi-block polymer can be deposited onto a highly permeable, non-selective layer producing a composite membrane comprising a thin dense layer of about 0.1 to 5 microns thick on a non-porous, permeable, non-selective, backing. The thick under layer (about 20 to 100 microns thick) serves as a support layer permitting one to produce thin, dense, selective layers of multi-block polymer membranes which would otherwise be mechanically unmanageable due to their thinness. In many instances, due to chemical similarities between the support layer and the selective layer, the two layers interact through hydrogen bonding to produce a very strong adhesion. For general low temperature applications the porous non-selective backing need not be capable of operating at high temperatures. In such service, such as the perstractive separation of aromatics from non-aromatics, backings such as polyurethane or polyurea-/urethanes would be sufficient. For higher temperature applications, of course, the backing material must itself be capable of remaining intact at the high temperature. For such application backings such as polyester/imides, Teflon ® or even ceramic, sintered glass or metal supports should be used.

If one were to use this technique to produce sheet material, the thick, permeable underlayer such as polyurethane can be deposited on a suitable casting backing material such as glass, metal, porous fiber glass, polyethylene, polypropylene, nylon, teflon, etc. after which the thin, dense selective layer would be deposited onto the underlayer. The casting backing material would then be removed leaving the composite sheet membrane.

In producing hollow fibers or tubes using this composite membrane technique, first a tube or hollow fiber of permeable material such as nylon, polyurea or polyurethane is produced after which a thin dense layer of the multi-block polymer material is deposited on either the outer or inner surface of the tube or fiber support.

A permeable polyurethane layer can be prepared from polyether glycols such as polypropylene glycol or polybutylene glycol plus aliphatic and/or aromatic diisocyanates (preferably aliphatic diisocyanates) using polyols (diols or triols) preferably aliphatic diols as chain extenders. Polyurethane membrane materials which satisfy the above requirement of permeability are the polyurethane membranes described in U.S. Pat. No. 4,115,465.

The membranes are useful for the separation of aromatics from non-aromatics in petroleum and chemical streams, and have been found to be particularly useful for the separation of larger, substituted aromatics from non-aromatics as are encountered in heavy cat naphtha streams. Other streams which are also suitable feed streams for aromatics from saturates separation are intermediate cat naphtha streams (200°–320° F.), light aromatics content streams boiling in the $C_5$-300° F. range, light catalytic cycle oil boiling in the 400°–650° F. range, reformate streams as well as streams in chemical plants which contain recoverable quantities of benzene, toluene, xylene (BTX) or other aromatics in combination with saturates. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams) the aromatic molecules present in the feedstream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$–$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

Pervaporation, by comparison, is run at generally higher temperatures than perstraction with the feed in either liquid or vapor form and relies on vacuum or a sweep gas on the permeate side to evaporate or otherwise remove the permeate from the surface of the membrane and maintain the concentration gradient driving force which drives the separation process. As in perstraction, the aromatic molecules present in the feed dissolve into the membrane film, migrate through said film and reemerge on the permeate side under the influence of a concentration gradient. Pervaporation separation of aromatics from saturates can be performed at a temperature of about 25° C. for the separation of benzene from hexane but for separation of heavier aromatic/saturate mixtures, such as heavy cat naphtha, higher temperatures of at least 80° C. and higher, preferably at least 100° C. and higher, more preferably 120° C. and higher (up to about 170° to 200° C. and higher) can be used, the maximum upper limit being that temperature at which the membrane is physically damaged. Vacuum on the order of 1–50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the internal space of the tube or fiber, the other material obviously being on the other side.

Most conveniently, the membrane is used in a hollow fiber configuration with the feed introduced on the exterior side of the fiber, the sweep liquid flowing on the inside of the hollow fiber to sweep away the permeated highly aromatic species, thereby maintaining the desired concentration gradient. The sweep liquid, along with aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering the temperature.

The present invention will be better understood by reference to the following Examples which are offered by way of illustration and not limitation.

EXAMPLE 1

An oxazolidone prepolymer was formed by weighing 34.4 grams (0.1 mole) epoxy resin (DER-332 from Dow Chemical) and 13.15 grams (0.05 mole) 4,4'-diisocyanato dicyclohexylmethane into a round bottom flask equipped with a stirrer and blanketed under nitrogen. The mixture was heated to 140° C. at which point 0.24 grams $ZnCl_2$ was added to catalyze the reaction. The solution was heated with stirring for 425 minutes with samples of the mixture being drawn once per hour for analysis by FTIR. At the end of the run, 30 grams of dimethylformamide were added and the solution was stirred to dissolve the viscous prepolymer. The final concentration of prepolymer was found to be 66.3 wt. % in DMF.

EXAMPLE 2

An ester prepolymer was prepared by adding 99.5 grams (0.05 mole) polyethylene adipate (about 2000 MW) and 21.81 grams (0.1 mole) pyromellitic dianhydride to another round bottom flask similarly equipped. To this was added 121 grams dimethylformamide and the solution was heated and stirred at 100° C. for 2 hours.

EXAMPLE 3

A second ester prepolymer was prepared by adding 25.28 grams (0.05 mole) polyethylene adipate (500 MW) and 21.81 grams (0.1 mole) pyromellitic dianhydride to another round bottom flask similarly equipped. To this was added 20 grams dimethylformamide and the solution was heated and stirred at 100° C. for 4 hours.

EXAMPLE 4

Seven point twenty-one (7.21) grams of oxazolidone prepolymer from Example 1 were then transferred to a flask containing 24.26 grams of ester prepolymer from Example 2 and the resulting mixture was stirred at room temperature for 45 minutes. Before the reaction went to completion, as evidenced by formation of a gel, and while the casting solution was of manageable viscosity, the solution was cast onto porous Teflon ® using a 10 mil casting knife. The film was placed into an oven at 100° C. under flowing nitrogen for 1 hour to drive off solvent and then heated to 150° C. for 4 hours to drive the reaction to completion. Thickness of the membrane was determined to be approximately 82 microns.

EXAMPLE 5

Seven point twenty-one (7.21) grams of the oxazolidone prepolymer from Example 1 were transferred to a flask containing 6.71 grams ester prepolymer from Example 3 and the resulting mixture was stirred at room temperature for 45 minutes. Before the reaction went to completion, as evidenced by the formation of a gel, and while the casting solution was of a manageable viscosity, the solution was cast onto porous Teflon ® using a 10 mil casting knife. The film was placed into an oven at 100° C. under flowing nitrogen for 1 hour and then heated to 150° C. for 4 hours to drive the reaction to completion. Thickness of the membrane was determined to be approximately 89 microns.

EXAMPLE 6

Pervaporation experiments were carried out using the membrane from Example 4. The feed for these evaluations consisted of 10 wt. % toluene, 40 wt. % p-xylene, 30 wt. % n-octane and 20 wt. % isooctane. It was pumped at a rate of approximately 1 cc/min through a preheat coil into a heated pervaporation cell containing approximately 27 $cm^2$ of effective membrane area. Temperature was accurately maintained within 1° C. of the setpoint. Vacuum on the permeate side was maintained with a small vacuum pump at approximately 20 torr and permeate samples were condensed into sample receivers immersed in dry ice-acetone cold traps. Results from the runs made are shown in Table 1. As can be seen, the selectivity for aromatics over saturates is very good.

EXAMPLE 7

A similar run was made using the membrane from Example 5 and the model feed mixture described in Example 6. Results from this run are shown in Table 2.

EXAMPLE 8

A run was made using the membrane from Example 5 using Powerformer Interstage product (product from the first reforming reactor) at 150° C. and 20 torr vacuum. Results of this run are shown in Table 3.

TABLE 1

| Temperature | Selectivity | | Permeability |
|---|---|---|---|
| (°C.) | Toluene/Isoctane | Total[1] | (Kg-μ/$m^2$/d) |
| 150 | 9.8 | 5.2 | 1976 |
| 120 | 16.0 | 7.0 | 818 |
| 100 | 29.1 | 8.9 | 428 |

TABLE 2

| | Selectivity | | Permeability |
|---|---|---|---|
| Temperature | Toluene/Isoctane | Total[1] | (Kg-μ/$m^2$/d) |
| 150 | 135 | 12.7 | 90 |

[1]Total Selectivity = Selectivity of all aromatics/saturates $$\text{Selectivity } i/j = \frac{(\text{Conc. } i/\text{Conc. } j)\text{permeate}}{(\text{Conc. } i/\text{Conc. } j)\text{feed}}$$

TABLE 3

| Temperature (°C.) | Selectivity | | | | Permeability (Kg-μ/m²/d) |
|---|---|---|---|---|---|
| | Toluene/Par. | $C_8$ Ar./Par. | $C_9$ Ar./Par. | Total Ar./Par. | |
| 150 | 21.2 | 21.0 | 13.2 | 16.6 | 42 |

Par. = all paraffins
$C_8$ Ar = xylenes and ethylbenzene
$C_9$ Ar = all $C_9$ benzenes

EXAMPLE 9

Another oxazolidone prepolymer was formed as follows: Approximately 26.3 grams (0.1 moles) of 4,4'-diisocyanato dicyclohexyl methane ($H_{12}$MDI), 68.8 grams (0.2 mole) diglycidyl ether of Bisphenol A (DER332) and 40.0 grams of cellosolve acetate were weighed into a three-neck round bottom flask under a dry nitrogen atmosphere. The flask was placed into a hot oil bath at 140° C. When the reactants reached 140° C., 0.48 gram $ZnCl_2$ dissolved into 23.0 grams cellosolve acetate was added to catalyze the reaction, which was allowed to proceed with stirring for a total of seven hours.

EXAMPLE 10

Approximately 8.7 grams (0.05 mole) toluene diisocyanate and 49.40 (0.025) grams polyethylene adipate (MW approximately 2000) were placed in a three neck round bottom flask under a dry nitrogen atmosphere. The flask was then placed into a hot oil bath at 75° C. and left there for two hours with constant stirring. The flask was then removed from the oil bath and 58.10 grams dimethylformamide were added with mixing.

EXAMPLE 11

Approximately 12.42 grams (0.05 mole) 3,3'-diaminodiphenylsulfone were dissolved in 37.34 grams of dry N-methyl pyrrolidone (NMP). Then 6.25 grams 4,4'-diisocyanato diphenylmethane (MDI) were dissolved into 37.34 grams of NMP. These two solutions were mixed in a three neck round bottom flask and reacted with stirring at 100° C. for two hours.

EXAMPLE 12

To a three-neck round bottom flask were added 54.60 grams NMP and 4.95 grams (0.025 mole) 4,4'-diaminodiphenylmethane. To that solution were added 8.7 grams (0.05 mole) toluene diisocyanate and the mixture was reacted at 75° C. for one hour.

EXAMPLE 13

Approximately 61.96 grams of NMP and 6.55 grams (0.025 mole) diisocyanato dicyclohexylmethane ($H_{12}$MDI) were added to a three neck round bottom flask with stirring to dissolve. Then 8.92 grams (0.05 mole) diethyltoluenediamine was added and the mixture was reacted at 95° C. for 2 hours. Infrared spectroscopy showed no isocyanate band present in the reaction product.

EXAMPLE 14

Diphenylsulfone dianhydride (DSDA) was mixed with an excess of ethanol and refluxed overnight (ca. 80° C.) to convert the dianhydride to the diacid/diethyl ester (DEEDSDA). Originally the DSDA was insoluble in the alcohol but became soluble during esterification. Excess alcohol was removed by evaporation.

Subsequently, 5.0 grams of DEEDSDA were mixed with 1.62 grams of diisocyanato dicyclohexylmethane ($H_{12}$MDI) and 6.63 grams NMP in a round bottom flask and reacted at 100° C. for 22 hours to form the DEEDSDA end-capped $H_{12}$MDI.

In the following Examples the prepolymers of Examples 9 through 14 were combined in various combinations and used to produce membrane sheets on support backings. These membranes were then tested for their ability to separate aromatics from non-aromatics under pervaporation conditions. In these Examples the pervaporation runs were conducted at the elevated temperatures recited in a unit which uses a helium sweep gas rather than vacuum and sweeps the permeate directly into the gas sampling valve of the gas chromatograph.

EXAMPLE 15

Approximately 4.15 grams (0.005 equivalents) of the oxazolidone prepolymer from Example 9 and 11.7 grams 0.005 equivalents) of the isocyanate end-capped polyester prepolymer from Example 10 were mixed in a small bottle and degassed under vacuum. After the viscosity had increased slightly, the liquid was cast onto a microporous Teflon ® backing and dried for 2 hours at 100° C. under nitrogen flow and 1 hour at 100° C. under hard vacuum. The film was then fully cured overnight at 150° C. and tested for the pervaporative separation of aromatics from saturates using the feed of Example 6. Final film thickness was 104 microns. Permeate from this experiment was swept away by helium at 100 cc/min into a gas sampling valve and analyzed by gas chromatography. Experiments were done at 60°, 70°, 80°, 90° and 100° C. and the results are shown in Table 4. Clearly this membrane is effective for aromatic/saturate separation.

EXAMPLE 16

Approximately 8.3 grams (0.005 equivalents) of oxazolidone prepolymer from Example 9 were mixed with 11.2 grams (0.005 equivalents) of the amine end-capped urea prepolymer from Example 11 in a small bottle and degassed under vacuum. Further heating at 100° C. reduced the solvent content to create sufficient viscosity for casting a film onto microporous Teflon ®. The cure cycle was the same as described in Example 15. Final film thickness was 138 microns. Pervaporation experiments using the feed of Example 6 were carried out at 170°, 180°, 190° and 200° C. at a helium sweep gas rate of 50 cc/min. Results of these experiments are shown in Table 5.

EXAMPLE 17

Approximately 8.3 grams (0.005 equivalents) of oxazolidone prepolymer from Example 9 were mixed with 13.65 grams (0.005 equivalents) of the isocyanate end-capped urea prepolymer from Example 12 in a small bottle and degassed under vacuum. After the viscosity increased somewhat, a film was cast onto microporous Teflon ® and dried/cured as described in Example 15. Final film thickness was 64 microns. Pervaporation experiments Were carried out at 170°, 180°, 190° and 200° C. using the feed described in Example 6 and the results are shown in Table 6.

EXAMPLE 18

Approximately 2.08 grams oxazolidone prepolymer from Example 9 were mixed with 3.87 grams of amine end-capped urea prepolymer from Example 13 in a small bottle along with 1 drop of DABCO TMR-30 catalyst. A film was cast onto microporous Teflon ® and dried at room temperature for one hour. It was then dried at 100° C. under nitrogen but not evacuated. Finally it was cured at 150° C. for 16 hours. Thickness of the membrane was 18 microns. Pervaporation experiments were carried out at 160°, 170°, 180°, 190° and 200° C. using the feed described in Example 6 and the results are shown in Table 7.

EXAMPLE 19

Approximately 5.02 grams of the ester prepolymer from Example 14 were mixed with 3.26 grams of the oxazolidone prepolymer from Example 9 in a small bottle. A thick film was cast onto microporous teflon, dried under flowing nitrogen overnight at room temperature, then dried at 100° C. under nitrogen. Final curing was carried out at 185° C. for 5 hours. Thickness of this membrane was 103 microns. Pervaporation experiments were carried out at 160°, 170° and 180° C. as above using the feed of Example 6 and a helium sweep rate of 100 cc/min. Results from this run are shown in Table 8.

TABLE 4

Pervaporation Results from Example 15.

| Temperature (°C.) | Selectivity | | | | Permeability |
|---|---|---|---|---|---|
| | Tol/Iso | Tol/n-Oct | p-Xyl/Iso | p-Xyl/n-Oct | (kg-μ/m²/d) |
| 60 | 17.9 | 10.9 | 12.1 | 7.4 | 319 |
| 70 | 15.8 | 9.9 | 10.7 | 6.7 | 540 |
| 80 | 14.1 | 9.1 | 9.7 | 6.2 | 861 |
| 90 | 12.6 | 8.3 | 8.8 | 5.8 | 1309 |
| 100 | 11.4 | 7.7 | 8.1 | 5.5 | 1879 |

TABLE 5

Pervaporation Results from Example 16.

| Temperature (°C.) | Selectivity | | | | Permeability |
|---|---|---|---|---|---|
| | Tol/Iso | Tol/n-Oct | p-Xyl/Iso | p-Xyl/n-Oct | (kg-μ/m²/d) |
| 170 | 13.0 | 6.8 | 12.7 | 6.6 | 18 |
| 1800 | 13.0 | 5.4 | 12.4 | 5.1 | 19 |
| 190 | 11.5 | 5.6 | 11.3 | 5.5 | 22 |
| 200 | 9.5 | 5.2 | 9.7 | 5.4 | 29 |

TABLE 6

Pervaporation Results from Example 17.

| Temperature (°C.) | Selectivity | | | | Permeability |
|---|---|---|---|---|---|
| | Tol/Iso | Tol/n-Oct | p-Xyl/Iso | p-Xyl/n-Oct | (kg-μ/m²/d) |
| 160 | 14 | 11.8 | 9.1 | 7.9 | 19 |
| 170 | 177 | 18.4 | 138 | 14.3 | 56 |
| 180 | 328 | 30.0 | 303 | 27.7 | 117 |
| 190 | 438 | 14.2 | 387 | 12.5 | 155 |
| 200 | 83 | 8.8 | 82 | 8.7 | 864 |

TABLE 7

Pervaporation Results from Example 18.

| Temperature (°C.) | Selectivity | | | | Permeability |
|---|---|---|---|---|---|
| | Tol/Iso | Tol/n-Oct | p-Xyl/Iso | p-Xyl/n-Oct | (kg-μ/m²/d) |
| 160 | 29.5 | 8.5 | 27.9 | 8.0 | 11 |
| 170 | 33.8 | 8.7 | 33.2 | 8.4 | 26 |
| 180 | 42.5 | 8.8 | 42.3 | 8.7 | 54 |
| 190 | 38.6 | 8.2 | 38.7 | 8.3 | 70 |
| 200 | 37.4 | 7.9 | 37.5 | 7.9 | 83 |

TABLE 8

Pervaporation Results from Example 19.

| Temperature (°C.) | Selectivity | | | | Permeability |
|---|---|---|---|---|---|
| | Tol/Iso | Tol/n-Oct | p-Xyl/Iso | p-Xyl/n-Oct | (kg-μ/m²/d) |
| 160 | 49.9 | 11.5 | 29.5 | 6.8 | 117 |
| 170 | 34.0 | 10.0 | 21.0 | 6.2 | 197 |

TABLE 8-continued

| Temperature (°C.) | Pervaporation Results from Example 19. | | | | Permeability (kg-μ/m²/d) |
|---|---|---|---|---|---|
| | Selectivity | | | | |
| | Tol/Iso | Tol/n-Oct | p-Xyl/Iso | p-Xyl/n-Oct | |
| 180 | 27.4 | 8.8 | 17.7 | 5.7 | 308 |

Notes:
Tol = Toluene
Iso = Isooctane = 2,2,4-trimethyl pentane
p-Xyl = p-Xylene
n-Oct = n-Octane
Selectivity i/j = [(Conc. i/Conc. j) permeate/(Conc. i/Conc. j) feed]

What is claimed is:

1. A method for separating aromatic hydrocarbons from feed streams comprising mixtures of aromatic hydrocarbons and non-aromatic hydrocarbons, said method comprising contacting the feed stream with one side of a membrane made from a multi-block polymer material comprising a first prepolymer comprising an oxazolidone made by combining (A) an epoxy with (B) a diisocyanate in an A/B or B/A mole ratio ranging from about 2.0 to 1.05, chain extended with a second, compatible prepolymer selected from the group of prepolymers consisting of (a) an (A) diisocyanate combined with a monomer selected from (B) polyester, diamine, and dianhydride or its corresponding tetraacid or diacid-diester, in an A/B mole ratio ranging from about 2.0 to 1.05, (b) an (A) dianhydride or its corresponding tetraacid or diacid-diester combined with a monomer selected from (B) epoxy, diisocyanate, polyester, and diamine, in an A/B mole ratio ranging from about 2.0 to 1.05, and (c) an (A) diamine combined with a monomer selected from (B) epoxy, diisocyanate, and dianhydride or its corresponding tetraacid or diacid-diester, in an A/B mole ratio ranging from about 2.0 to 1.05, and mixtures thereof, said separation being conducted under pervaporation or perstraction conditions, whereby the aromatic hydrocarbon component of the feed stream selectively permeates through the membrane.

2. The method of claim 1 wherein when the oxazolidone first prepolymer is made by reacting the di isocyanate and epoxy in a diisocyanate/epoxy mole ratio ranging from about 2.0 to 1.05 resulting in an isocyanate end-capped prepolymer, and the second prepolymer is made by reacting (A) diisocyanate with a (B) polyester, diamine, or dianhydride or its corresponding tetraacid or diacid-diester in an A/B mole ratio ranging from about 2.0 to 1.05, resulting in an isocyanate end-capped second prepolymer, the two prepolymers are combined in the presence of a trimerization catalyst to produce an isocyanurate crosslinked polymer membrane used in the aromatics separation process.

3. The method of claim 1 or 2 wherein the membrane comprises a thin, dense film of said multiblock polymeric material deposited on a microporous support layer producing a thin film composite membrane.

4. The method of claim 3 wherein the micro porous support layer is nylon, porous polypropylene, porous Teflon ®, porous polyurethane or porous polyurea.

5. The method of claim 1 or 2 wherein the membrane layer ranges from about 0.1 to about 5.0 microns in thickness.

6. The method of claim 3 wherein the membrane layer ranges from about 0.1 to about 5.0 microns in thickness.

7. A membrane made of a multi-block polymer comprising a first prepolymer comprising an oxazolidone made by combining (A) an epoxy with (B) a diisocyanate in an A/B or B/A mole ratio ranging from about 2.0 to 1.05, chain extended with a second, compatible prepolymer selected from the group of prepolymers consisting of (a) an (A) diisocyanate combined with a monomer selected from (B) polyester, diamine, and dianhydride or its corresponding tetraacid or diacid-diester, in an A/B mole ratio ranging from about 2.0 to 1.05, (b) an (A) dianhydride or its corresponding tetraacid or diacid-diester combined with a monomer selected from (B) epoxy, di isocyanate, polyester, and diamine, in an A/B mole ratio ranging from about 2.0 to 1.05, and (c) an (A) diamine combined with a monomer selected from (B) epoxy, di isocyanate, and dianhydride or its corresponding tetra-acid or diacid-diester, in an A/B mole ratio ranging from about 2.0 to 1.05, and mixtures thereof.

8. The membrane of claim 7 wherein when the oxazolidone first prepolymer is made by reacting the di isocyanate and epoxy in an about 2 to 1.05 mole ratio resulting in an isocyanate end capped prepolymer, and the second prepolymer is made by reacting (A) diisocyanate with (B) polyester, diamine, or dianhydride or its corresponding tetraacid or diacid-diester, in an A/B mole ratio ranging from about 2.0 to 1.05, resulting in an isocyanate end capped second prepolymer, the two prepolymers are combined in the presence of a trimerization catalyst to produce an isocyanurate cross linked polymer.

9. The membrane of claim 7 or 8 comprising a thin, dense film of said multi block polymer material deposited on a micro-porous support layer producing a thin film composite membrane.

10. The membrane of claim 9 wherein the micro-porous support layer is nylon, porous polypropylene, porous Teflon ®, porous polyurea or porous polyurethane.

11. The membrane of claim 7 or 8 wherein the membrane layer ranges from about 0.1 to about 50 microns in thickness.

12. The membrane of claim 9 wherein the membrane layer ranges from about 0.1 to about 5.0 microns in thickness.

* * * * *